United States Patent
Rei et al.

(10) Patent No.: US 6,699,815 B2
(45) Date of Patent: Mar. 2, 2004

(54) BORON NITRIDE SUPPORTED NOBLE METAL CATALYST

(75) Inventors: Min-Hon Rei, No. 64-8, Alley 140, Lane 101, Sec. 4, Hsin-Hai Rd., Taipei (TW); Chi-Sheng Wu, Taipei (TW); Zhi-An Lin, Taipei (TW); Jen-Wei Pan, Taipei (TW)

(73) Assignee: Min-Hon Rei, Taipei (TW)

( * ) Notice: Subject to any disclaimer, the term of this patent is extended or adjusted under 35 U.S.C. 154(b) by 0 days.

(21) Appl. No.: 10/287,991

(22) Filed: Nov. 4, 2002

(65) Prior Publication Data

US 2003/0078158 A1 Apr. 24, 2003

Related U.S. Application Data

(63) Continuation-in-part of application No. 09/777,488, filed on Feb. 5, 2001, now abandoned.

(30) Foreign Application Priority Data

Jun. 21, 2000 (TW) ........................................ 89112230 A

(51) Int. Cl.$^7$ ............................ B01J 27/24; B01J 21/02
(52) U.S. Cl. ...................................... 502/200; 502/207
(58) Field of Search ................................. 502/207, 200

(56) References Cited

U.S. PATENT DOCUMENTS

| | | |
|---|---|---|
| 4,045,369 A | 8/1977 | Cantaluppi |
| 4,122,671 A | 10/1978 | Armstrong et al. |
| 4,163,736 A | 8/1979 | Acres et al. |
| 4,897,253 A | 1/1990 | Jenkins |
| 5,928,984 A | 7/1999 | von Hippel et al. |
| 5,969,166 A | 10/1999 | Scharbert et al. |
| 6,034,270 A | 3/2000 | Borchert et al. |

*Primary Examiner*—Elizabeth Wood

(57) ABSTRACT

A noble metal catalyst supported on boron nitride (BN) is used for the deep oxidation of organic compounds. The superior activity of the catalyst provides an extreme low light-off temperature and a short induction period at the deep oxidation reaction of organic compounds in air stream. The catalyst outperforms the traditional oxide-supported Pt catalysts with respect to the life and activity. The specific surface area of BN ranges from 1 to 100 m$^2$/g, and the loading of the noble metal is in the range of 0.1 to 5.0 wt %. The noble metal can be selected from a group consisting of platinum (Pt), palladium (Pd), rhodium (Rh), Ruthenium (Ru) and a mixture thereof.

7 Claims, 9 Drawing Sheets

BORON NITRIDE SUPPORTED NOBLE METAL CATALYST

This application is a cip of application Ser. No. 09/777,488 filed Feb. 5, 2001 and now abandoned.

FIELD OF THE INVENTION

This invention relates to a noble metal catalyst, and more particularly to a boron nitride (BN) supported noble metal catalyst.

BACKGROUND OF THE INVENTION

Volatile organic compound (VOC) is a low boiling-point hydrocarbon and is one of primary air pollutants. The sources of VOC include the exhaust gas from the automobiles, the gasoline vapor from the gas station, the organic solvent in the printing shops, and so on. It's well known that VOCs, such as methanol, benzene and gasoline, are harmful to the human health. Catalytic combustion is one of effective methods to eliminate VOC in air via the deep oxidation to water and carbon dioxide. Conventionally, supported noble metal catalyst using oxides as supporting material, e.g. supported Pt gamma-alumina, is often used in the deep oxidation of VOC (J. J. Spivey, Ind. Eng. Chem. Res., 26, 2165-2180, 1987).

In general, a high temperature in the range of 200° C. to 500° C. is required for complete combustion of VOC to occur even with the help of noble metal catalyst, such as $Pt/Al_2O_3$. This can be costly as extra fuel and lengthy induction time are often required to bring the VOC stream to the desired reaction temperature. The advantage of low oxidation temperature can reduce fuel consumption particularly for large volumes of dilute VOC polluted air as well as shorten the induction time by low light-off temperature. Traditional metal oxide supports, such as $Al_2O_3$, $SiO_2$, and zeolite are insulating material and possess rather low thermal conductivity, as well as facile phase transformation to another crystalline phase under water vapor at high temperature. Accumulation of exothermic reaction heat may be severe on those hot spots and lead to the deactivation of catalyst activity during deep oxidation of VOC. The property of support also plays an important role in supported noble metal catalysts. A metal-support interaction generally exists in most oxide-supported metal catalysts and brings about a negative influence on the catalytic activity. Therefore, one way to avoid these disadvantages would be the use of a non-oxide material as the support.

The graphite-like hexagonal boron nitride (BN) is the most stable isomer of BN under ambient conditions. It exhibits high thermal conductivity, thermal stability, acid-base resistance, oxidation resistance, and appropriate mechanical strength. Furthermore, BN is hydrophobic preventing moisture condensation on its surface (K. Niedenzu and J. W. Dawson, Boron Nitride, Boron-Nitrogen Compounds, Chapter 6, Springer-Verlag, Berling, 1965).

As known in the prior arts, boron nitride was reported as catalyst materials in several applications. Pieters et al. (U.S. Pat. No. 4,060,499) described a catalyst consisting of cuprous chloride intercalated in crystalline BN for substituted chlorination reaction. Monnier and Muehlbauer (U.S. Pat. No. 4,950,773) disclosed a selective epoxidation of olefins using supported Ag catalyst, in which BN was one of inorganic supporting materials. Yoneda et al.(U.S. Pat. No. 4,956,326) reported a Pt catalyst comprising a ceramic supports, such as carbides, nitrides and oxides for dehalogenation of a halide. Submicron BN particle was used as an activating catalyst in the formation of polysiloxane resins in the U.S. Pat. No. 6,183,873. Jenkins (U.S. Pat. No. 4,897,253) reported a catalytic process for the generation of hydrogen via the partial oxidation of hydrocarbons using a platinum and chromium oxide supported on silica, and suggested other refractory, such as carbide and nitride, could be one option of supporting materials. German researchers von Hippel et al. (U.S. Pat. No. 5,928,984) developed a process for preparing catalytically active coatings for the synthesis of hydrogen cyanide on molded items consisting of Pt and aluminum oxides, which could also be replaced by nitrides, such as BN. Acres and Darling (U.S. Pat. No. 4,163,736) disclosed a method to coat a refractory compound with a magnesia barrier layer and Pt group metal. The refractory core was selected from oxides, carbides or nitride. The refractory compound can be used under non-oxidizing or reducing reaction condition at high temperature. Jacobsen reported that the ammonia synthesis reaction can be performed using a barium-promoted BN-supported ruthenium catalyst (C. J. H. Jacobsen, J. Catal. 200, 1-3, 2001).

However, none of the above prior arts is applied in the deep oxidation of organic compounds in that the advantages of BN as a support in the oxidation reaction is most desirable. The present invention discloses a novel BN supported Pt group metal catalyst for the deep oxidation of organic compounds.

SUMMARY OF THE INVENTION

It is an object of the present invention to provide a boron nitride supported noble metal catalyst for deep oxidation of organic compounds.

In accordance with an aspect of the present invention, BN can be purchased from a commercial market with a specific surface area ranging from 1 to 100 $m^2/g$. Precursor salt, contained noble metal is dissolved in an organic solvent resulting in a noble metal/solvent solution. The BN supported noble metal catalyst is prepared by the so called "incipient wetness technique" to disperse the noble metal on the surface of BN. In this technique, the powder BN is soaked with a minimum volume of noble metal-solvent solution which is just sufficient to be fully absorbed by the given amount of BN. A loading of noble metal is preferably ranging from 0.1 to 5.0 wt % of the catalyst. The BN supported noble metal catalyst is dried at ambient temperature, then thermal treated at 300–400° C. for one hour, under a flow of nitrogen, air, oxygen or hydrogen/nitrogen mixture.

The superior activity of BN supported noble metal catalyst is demonstrated by the extreme low light-off temperatures in the deep oxidation reaction of organic compounds under air stream. The concentration of organic compounds ranges from 100 to 20 vol % at volume hourly space velocity (VHSV) of 2000–40000 $hr^{-1}$ and temperature in the range of 0 to 600° C. In conclusion, Pt/BN outperforms the traditional oxide-supported Pt catalysts with respect to the life and activity.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
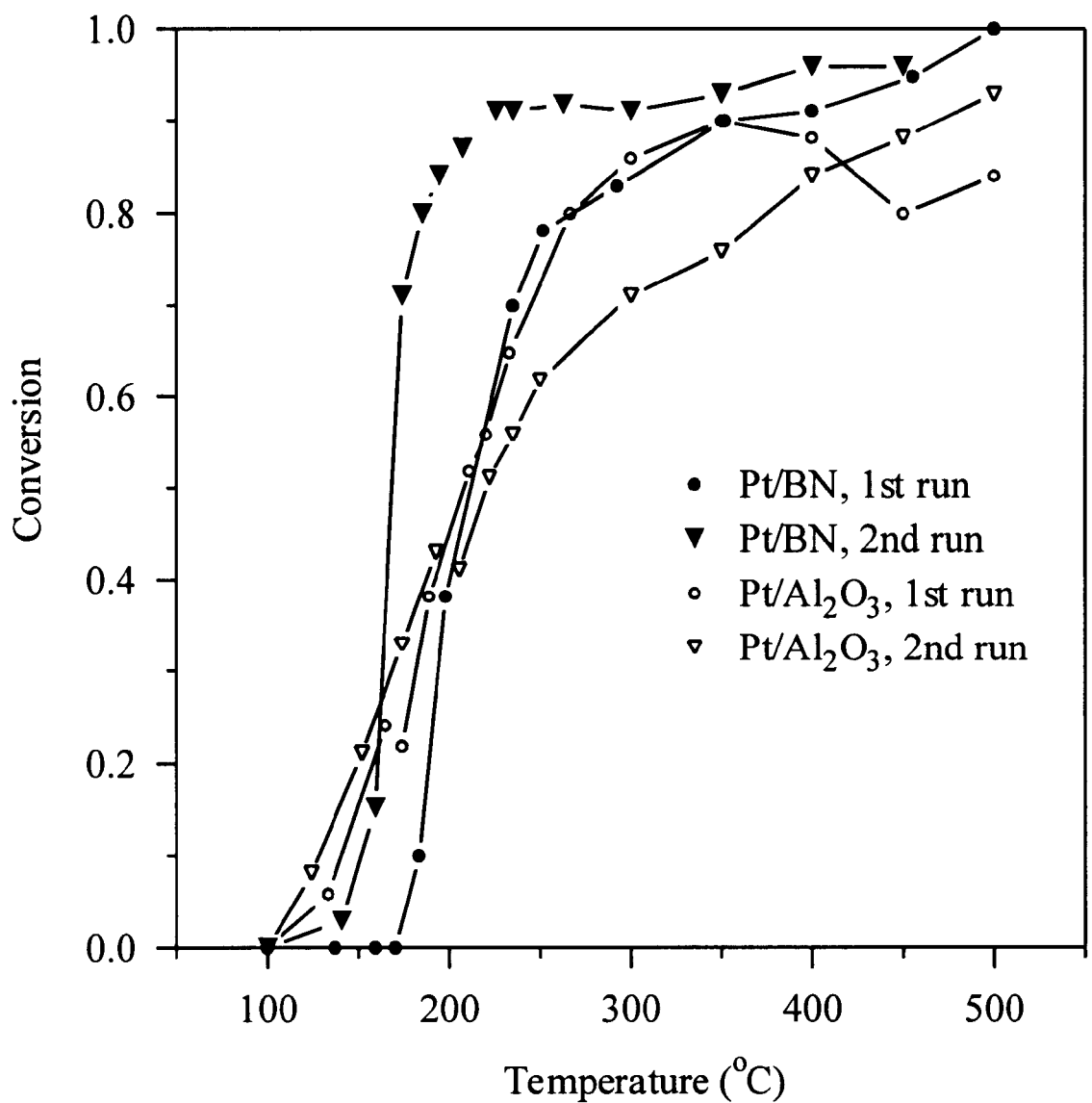
FIG. 1 shows the conversion of 95 unleaded gasoline vapor which is oxidized in air by the Pt/BN catalyst and the $Pt/Al_2O_3$ catalyst, respectively.

The invention is described more specifically with reference to the following embodiments. It is to be noted that the following descriptions of preferred embodiments of this invention are presented herein for purpose of illustration and description only; it is not intended to be exhaustive or to be limited to the precise form disclosed.

The advantages of using BN as a catalyst support for oxidation reaction are described below.

(a) The physical or chemical properties of the support (BN) are stable at high temperature because of its high thermal stability.

(b) No hot spot will develop by exothermic oxidation reaction because of high thermal conductivity of support (BN). Thus, the clusters of noble metal, which is supported on support (BN), won't be sintered during reaction. The catalyst activity can be maintained for longer time.

(c) The catalyst is not damaged by acidic or basic agents because of chemical inertness of the BN support, (d) Moisture cannot condense inside the pores of support (BN) because of its hydrophobicity. Therefore the surface of catalyst won't be covered by moisture to hinder catalytic reaction, and the oxidation activity is enhanced.

A BN supported noble metal catalyst is used to completely oxidize organic compounds to water and carbon dioxide. BN is a white flake-type powder compound in appearance which can be purchased on the commercial market. The noble metal is selected from a group consisting of platinum (Pt), palladium (Pd), rhodium (Rh), Ruthenium (Ru) and a mixture thereof, preferably Pt. The noble metal is dispersed on the surface of BN support, and the loading is from 0.1 to 5.0 wt %. The specific surface area of BN supported noble metal catalyst is from 1 to 100 $m^2/g$, preferably from 30 to 80 $m^2/g$.

The noble metal is dispersed on the surface of BN by the so called "incipient wetness technique". For better soaking on the hydrophobic BN support, an organic solvent of alcohols, preferably methanol is chosen as the diluting solvent. The quantity of methanol required to completely fill the pore volume of support (BN) is predetermined. A noble metal complex compound of Pt, Pd, Rh or Ru, preferably in hexachloride or hexamine salt, e.g., $H_2PtCl_6.H_2O$, is dissolved in methanol resulting in a Pt-methanol solution. The amount of Pt-methanol solution applied for the impregnation is typically from 95 to 100% of the absorptive capacity of support (BN). The concentration of Pt in Pt-methanol solution is controlled to allow the total absorption by the support (BN) to achieve the desired 0.1 to 5 wt % level of Pt in the catalyst. After impregnation, the catalyst is dried at ambient temperature overnight. The catalyst is then thermal treated at 300–400° C. for one hour, with a 3° C./min rise from room temperature under a flow of nitrogen, air, oxygen or hydrogen/nitrogen mixture, preferably a flow of 20% $H_2$ in $N_2$ mixture, then stored in a desiccator for later use.

An oxygen containing stream, preferably air stream, which bubbles through a saturator filled with liquid hydrocarbon carried the organic compounds of paraffins, olefins, aromatics or alcohols with carbon number C1 to C8. The concentrations of organic compound is regulated by the temperature of the saturator and is mixed with an additional air stream. The concentrations of organic compounds are in the range of 100 ppmv to 20 vol %, preferably 2000 ppmv to 10 vol %. The deep oxidation is carried out at temperatures ranging from 0 to 600° C. under atmospheric pressure. The catalyst is charged in the middle of a straight-tube Pyrex reactor with a 16-mm ID. The reactant flow is tuned to a volume hour space velocity (VHSV) of 2000–40000 $hr^{-1}$, preferably 2500–20000 $hr^{-1}$. The primary oxidation products are $CO_2$ and $H_2O$ only.

EXAMPLE 1

Catalysts Preparation

The BN powder was purchased from the High Performance Material Inc., Taiwan. Another support, gamma-alumina (Merck, USA), was chosen for comparison. Platinum catalysts were prepared by the so-called "incipient wetness technique" aiming for 0.3 wt % Pt with BN and gamma-alumina as supports designated as Pt/BN and $Pt/Al_2O_3$, respectively. Precursor salt, $H_2PtCl_6.H_2O$, was purchased from Aldrich (USA), contained ~40 wt % of platinum. For better soaking on the hydrophobic BN support, methanol was chosen as the diluting solvent. The quantity of methanol required to completely fill the pore volume of support was predetermined. The amount of methanol-soluble Pt solution applied for the impregnation was typically from 95 to 100% of the absorptive capacity of support. The Pt concentration in solution was controlled to allow the total absorption by the support to achieve the desired 0.3 wt % level of Pt in the catalyst. After impregnation, the catalysts were dried at ambient temperature overnight. All the catalysts were then reduced at 300° C. for one hour, with a 3° C./min rise from room temperature under a flow of 20% $H_2$ in $N_2$ mixture, then stored in a desiccator for later use.

EXAMPLE 2

Deep Oxidation of 95 Unleaded Gasoline Vapor

The unleaded octane 95 gasoline was purchased from a gas station of China Petroleum Cooperation, Taiwan. This gasoline had a specification of about 35 vol % of aromatics and balanced by paraffins and olefins. An air stream bubbled through a saturator filled with liquid hydrocarbon to carry the gasoline vapor. The concentrations was regulated by the temperature of the saturator and was mixed with an additional air stream. The concentrations of gasoline vapor was 2500 ppmv. The reactions were performed at temperatures ranging from 25 to 500° C. under atmospheric pressure. The catalyst (0.3 g) was charged in the middle of a straight-tube Pyrex reactor with a 16-mm ID. A thermocouple was placed in the center of the catalyst bed to record the reaction temperature and also to control the furnace temperature. The flow rates of reactant were set to a volume hour space velocity (VHSV) of 20000 hr$^{-1}$. Since gamma-alumina was denser than BN, the reactant flow rate was adjusted accordingly for the same VHSV to be maintained within Pt/Al$_2$O$_3$. The reaction temperature was usually increased from low to high, and was decreased again to low temperature in some cases to check consistency. Typically, an accumulated run time lasts nearly 30 hours per catalyst. The primary oxidation products were found to be CO$_2$ and H$_2$O only. That was, under experimental conditions carbon monoxide and other partial oxidation products were virtually undetectable. The conversion of the oxidation reaction was defined as $$\text{Conversion}(\%) = [1 - (C_{Ro}/C_{Ri})] \times 100\%$$

wherein $C_{Ri}$ was the entrance concentration of the gasoline, and $C_{Ro}$ was the exit concentration of the gasoline.

Figure 2:
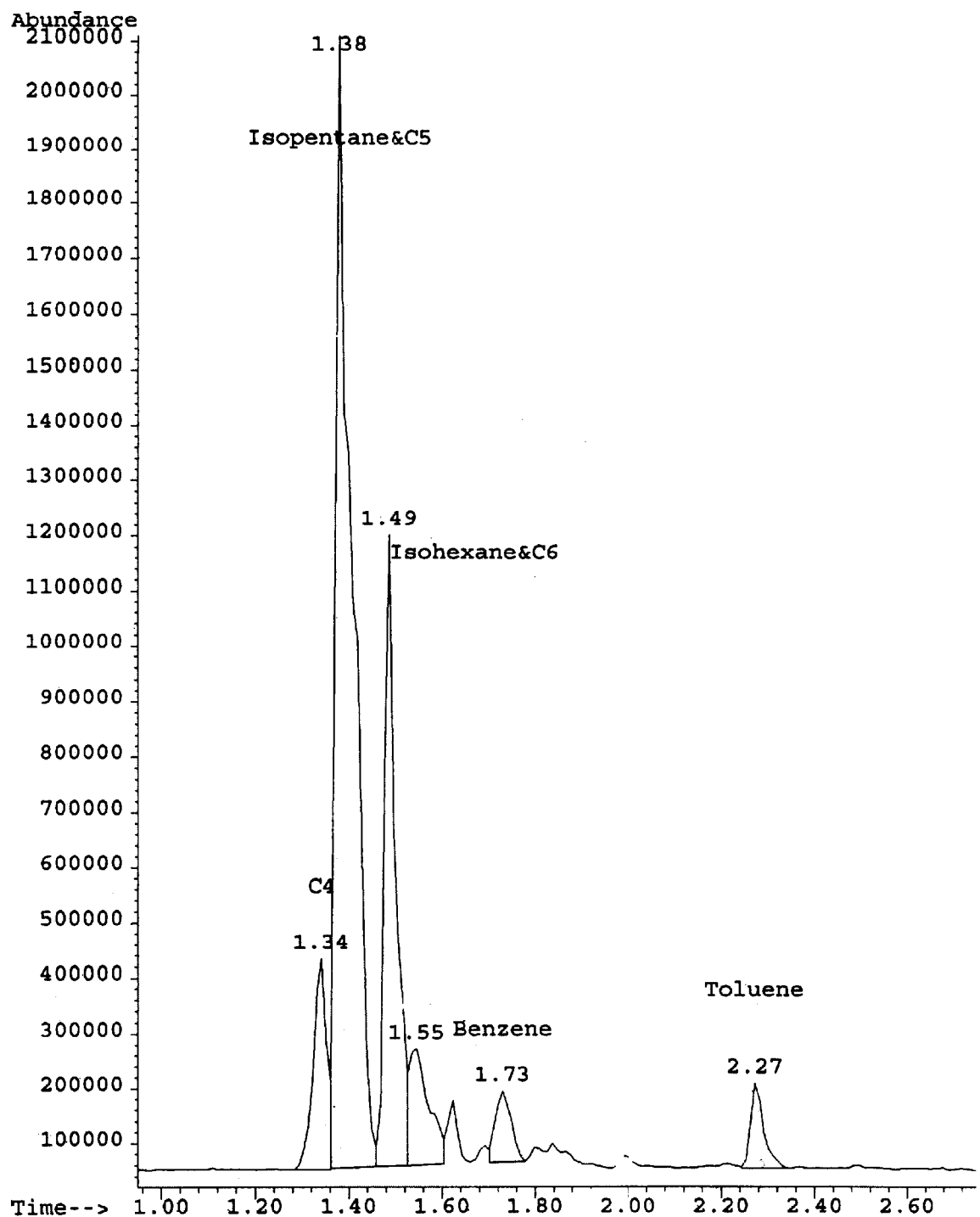
FIG. 2 is a chromatograph showing the composition of 95 unleaded gasoline vapor.

In general, the light-off temperature is defined as the temperature at which conversion reaches 50%. The lower the light-off temperature, the higher the activity and the better the catalyst are. FIG. 1 depicts the oxidation results of the unleaded gasoline vapor on Pt/BN and Pt/Al$_2$O$_3$, respectively. The composition of unleaded gasoline vapor is shown in FIG. 2, which is analyzed by an HP 1800B GC/Mass. As shown in FIG. 1, the activity of Pt/BN is superior to that of Pt/Al$_2$O$_3$. Initially the activities of Pt/BN and Pt/Al$_2$O$_3$ were not noticeably distinguished and the light-off temperatures are near 210° C. After the reactor was cooled to room temperature, the second run reaction was re-started and the temperature increased to 500° C. During the second run reaction, two catalysts showed a significant difference. The light-off temperature of Pt/BN decreased to near 170° C. and the oxidation quickly attained a conversion greater than 95% at 220° C., while the activity of Pt/Al$_2$O$_3$ declined. The light-off temperature of Pt/Al$_2$O$_3$ increased slightly to 220° C., and temperatures greater than 500° C. were required to achieve 90% conversion due to deactivation in the second run.

EXAMPLE 3
Three Consecutive Runs of Deep Oxidation of Gasoline Vapor

Figure 3:
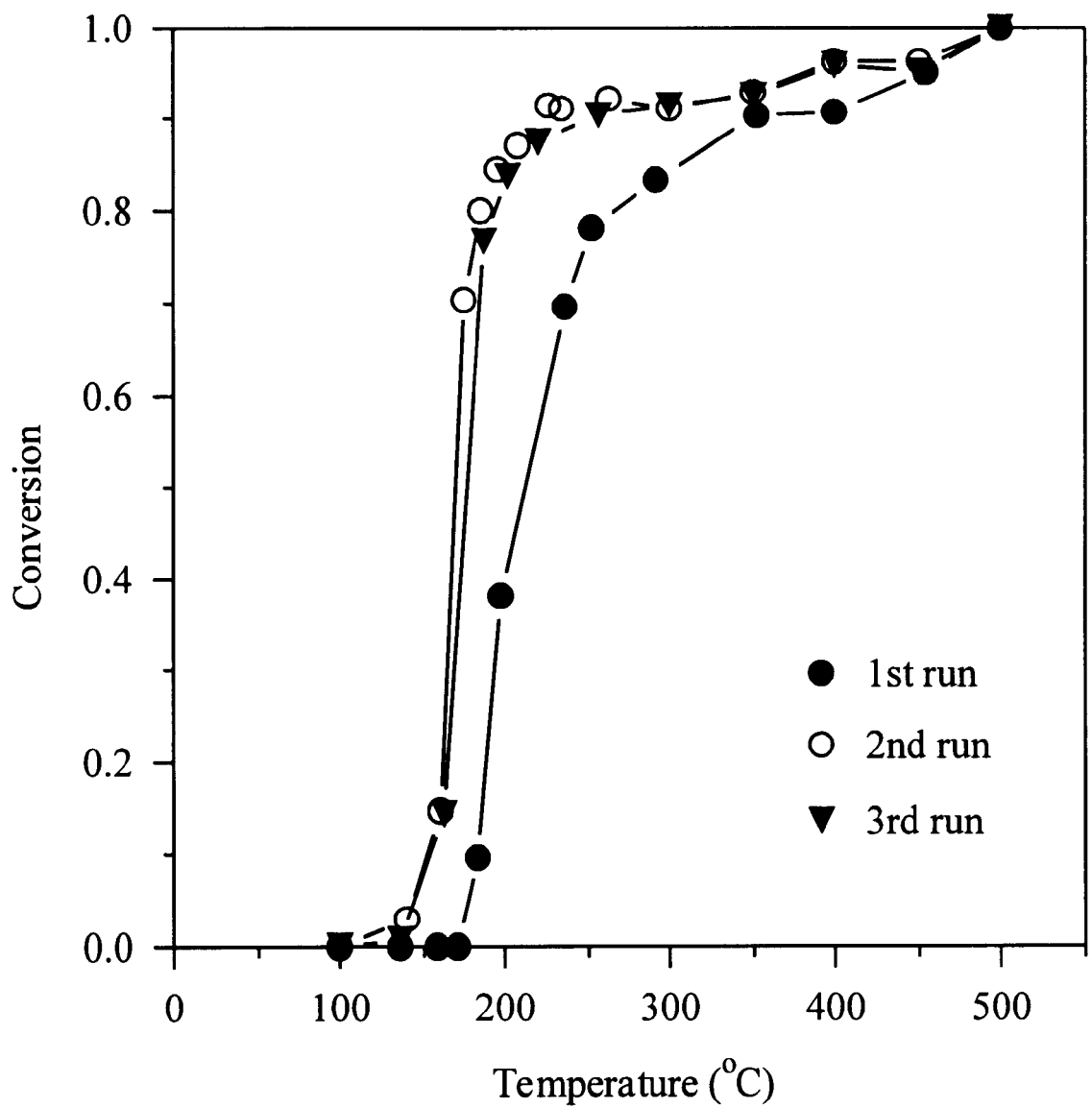
FIG. 3 shows the conversion of the 95 unleaded gasoline vapor which is oxidized in air by the Pt/BN catalyst for three times.

The catalytic deep oxidation of three consecutive runs were carried out under the same conditions as in Example 1. FIG. 3 depicts the oxidation of Pt/BN for three cycles. Notably, the activity was well maintained during the 3rd run. The results indicated that, after the first oxidation, the Pt surface became more active, and was preserved thereafter on BN support.

EXAMPLE 4
Long-term Deep Oxidation of Gasoline Vapor

Figure 4:
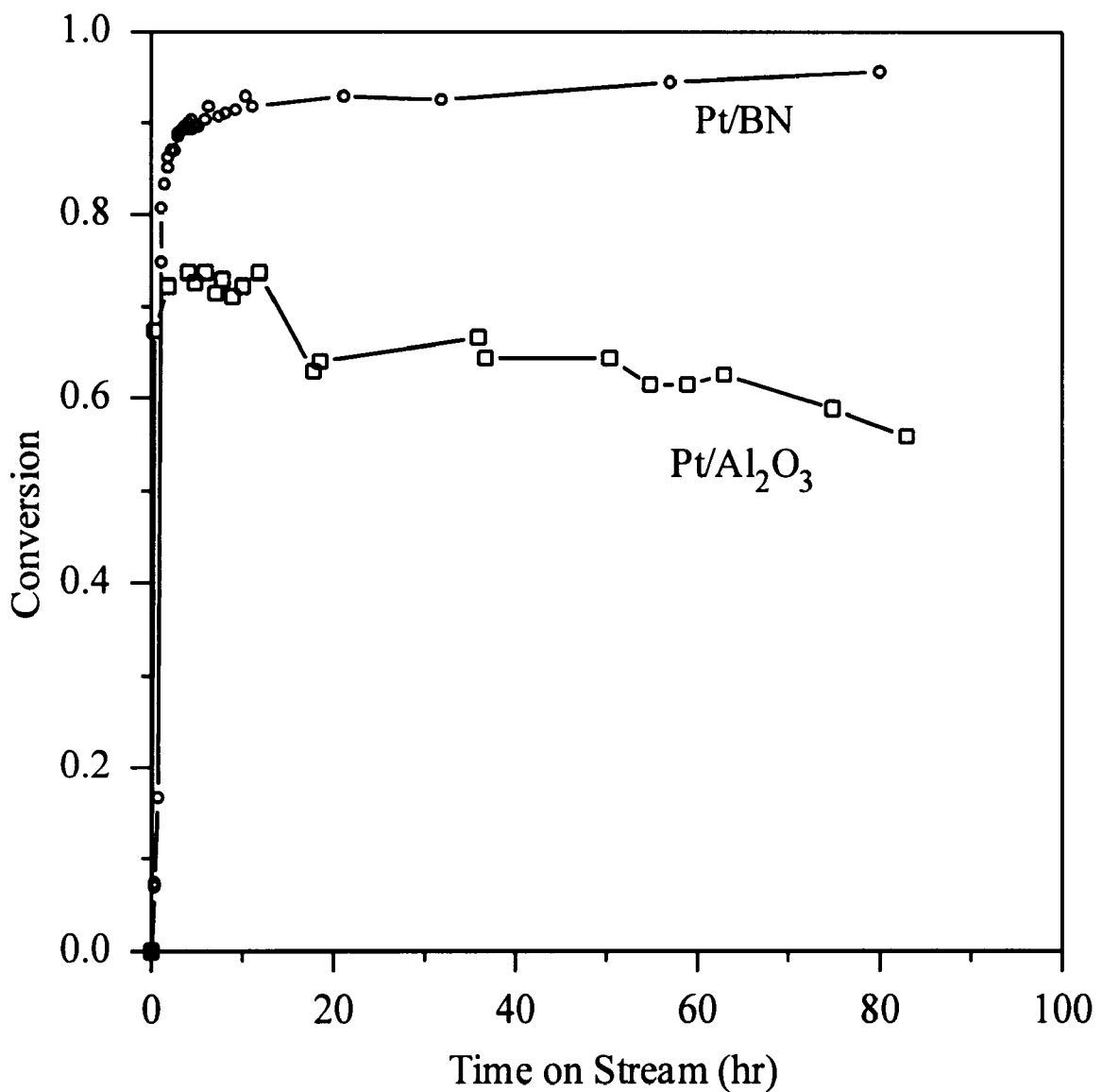
FIG. 4 shows the conversion of the 95 unleaded gasoline vapor which is oxidized in air by the Pt/BN catalyst in eighty hours.

The long-term deep oxidation of gasoline vapor is conducted on Pt/BN and Pt/Al$_2$O$_3$ catalysts under the same conditions as in Example 1. FIG. 4 demonstrates the long-term stability of Pt/BN in comparison with Pt/Al$_2$O$_3$. The oxidation was maintained at 185° C. to study the deactivation of catalysts. Within 2 hours, the conversions were quickly increased to 90% and 72% in Pt/BN and Pt/Al$_2$O$_3$, respectively. The activity of the former was well sustained for 80 hours, and showed no sign of deactivation. The activity was maintained because the active Pt clusters were not sintered in the hot spots due to the high thermal conductivity of BN support. In contrast, the conversion of Pt/Al$_2$O$_3$ began to decrease after 15 hours, then gradually declines to less than 60%.

EXAMPLE 5
Deep Oxidation of Benzene, Toluene and Xylene

Figure 5A:
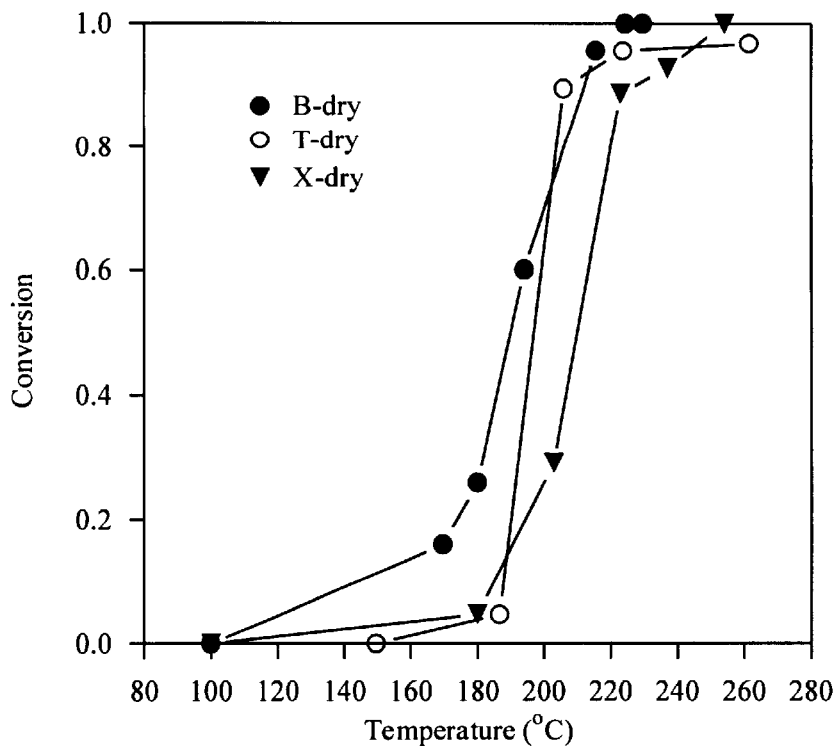
FIG. 5(a) shows the conversions of benzene (B), toluene (T) and xylene (X), respectively, which are oxidized in air by the Pt/BN catalyst.
Figure 5B:
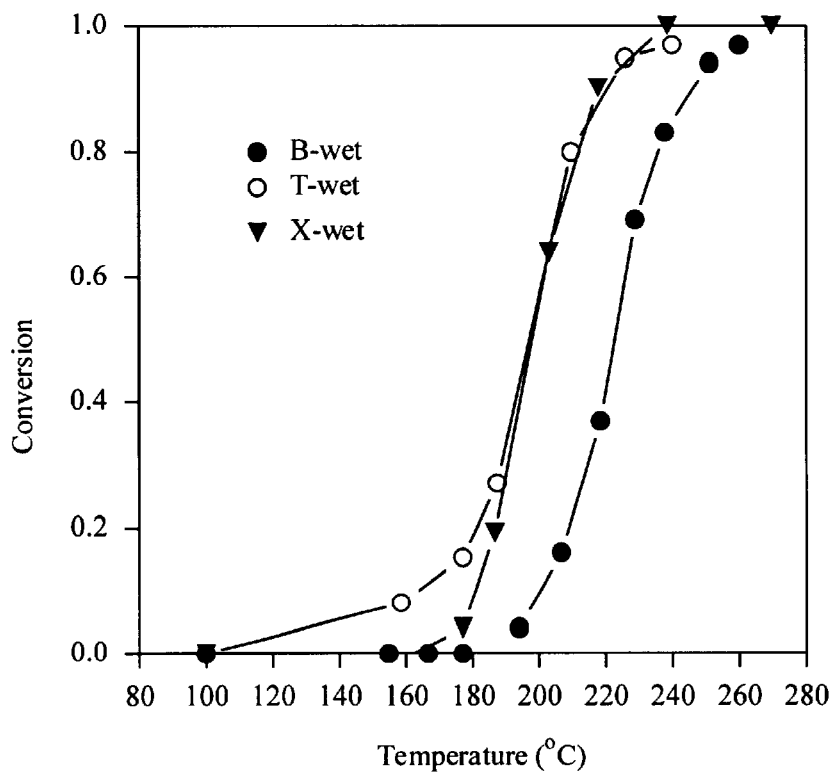
FIG. 5(b) shows the conversions of benzene (B), toluene (T) and xylene (X), respectively, which are oxidized in wet air with 6% moisture by the Pt/BN catalyst.

The catalytic deep oxidation of benzene (B), toluene (T) and xylene (X) were carried out under the same conditions as in Example 1, except the concentrations and the VHSV. The concentrations of BTX ranged from 600–2000 ppmv, and the VHSV was in the range of 16000–23000 hr$^{-1}$. FIGS. 5(a) and 5(b) show the conversion of benzene, toluene, xylene on the Pt/BN catalyst under the dry and wet conditions, respectively. The wet condition was conducted by adding 6 vol % water vapor in the feed to study the moisture influence. The light-off curves were very steep. As shown in FIG. 5(a), the light-off temperatures of BTX were in the range of 180 to 210° C. in dry air stream and the temperatures above 230° C. were required to reach higher than 90% conversion. As shown in FIG. 5(b), under the wet condition, the light-off temperatures of toluene and xylene were not changed near 200° C. indicating the advantage of using hydrophobic BN as support. The light-off temperature of benzene was near 220° C. under the wet condition, and it was higher than that of the dry condition. Because of the graphite-like structure of BN, a special affinity between benzene and BN surface may be hindered by water so that the activity is significant reduced in the benzene oxidation.

EXAMPLE 6
Deep Oxidation of Methanol

Figure 6:
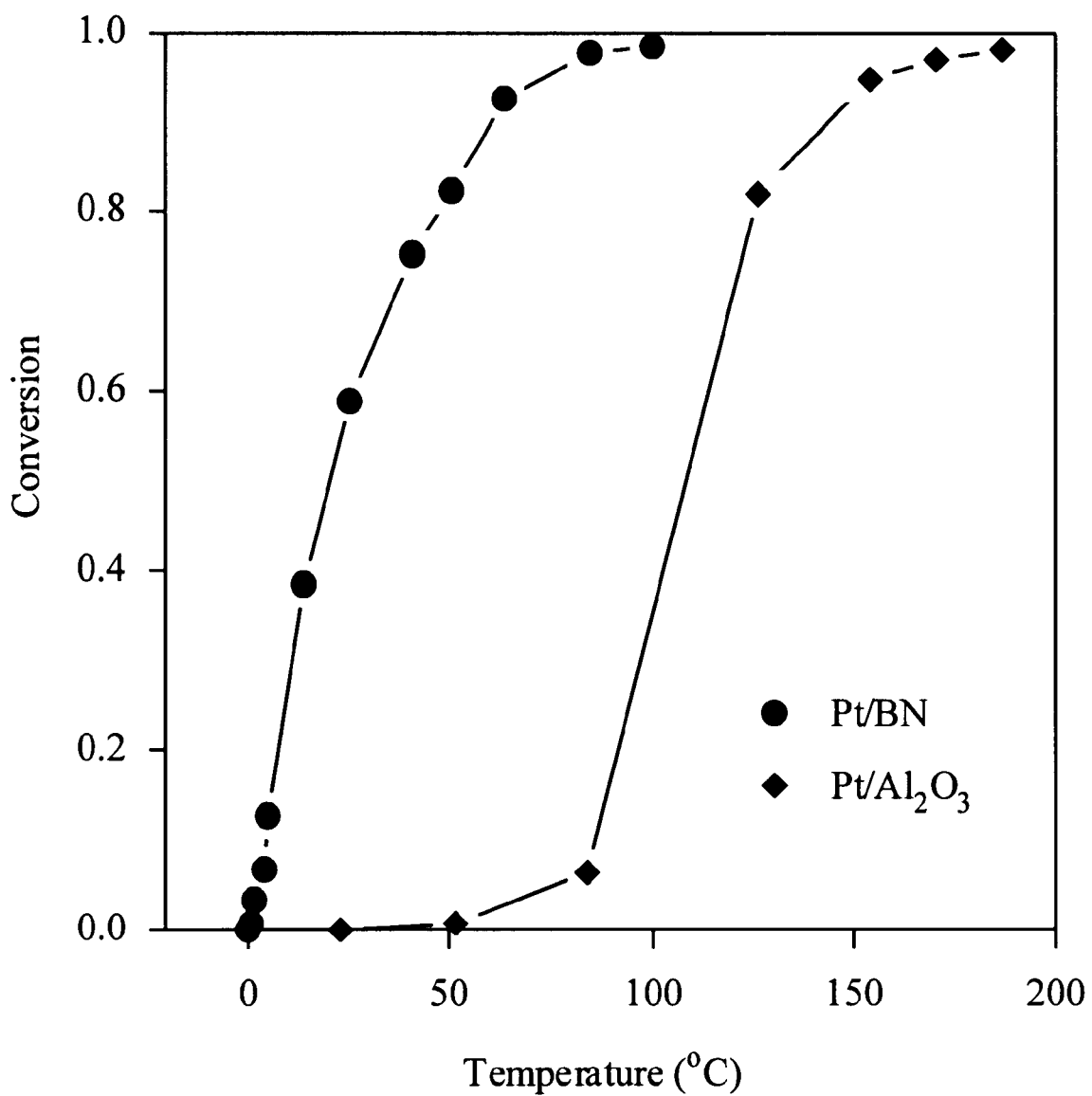
FIG. 6 shows the conversion of methanol vapor which is oxidized in air by the Pt/BN catalyst and the $Pt/Al_2O_3$ catalyst, respectively.

The deep oxidation of methanol was conducted on Pt/BN and Pt/Al$_2$O$_3$ catalysts under the same conditions as in Example 1, except the concentrations and the VHSV. The concentration of methanol ranged from 1000–4000 ppmv, and the VHSV was 50000 hr$^{-1}$. FIG. 6 shows the temperature dependencies of methanol oxidation on Pt/BN and Pt/Al$_2$O$_3$, respectively. The conversion curves with temperature was very steep. As shown in FIG. 6, the light-off temperature of Pt/BN was as low as 20° C., and deep oxidation of methanol can be achieved under 80° C. The activity of Pt/BN was far superior to that of Pt/Al$_2$O$_3$.

EXAMPLE 7
Oxidation of Methanol in High Concentration

The deep oxidation of methanol was conducted on Pt/BN catalysts under the similar conditions as in Example 6, except the concentrations and the VHSV. The oxidation of methanol in high concentration was carried out at 50° C. with molar ratio of oxygen to methanol at 1.65 (110% of stoichiometric ratio) in Liebig condenser fitted to a round bottom flask immersed in a water bath of 52° C. Air was bubbled through the methanol into the Pt/BN catalyst to carry methanol vapor of 10.6 vol % into the catalyst zone which was maintained at 50° C. by circulating warm water of 50° C. Once the reactants were brought into contact with the Pt/BN catalyst, temperature rise of 2 to 3 degree was noticed. The conversions were 34% and 51% when the VHSV were 10,000 and 2500 hr$^{-1}$, respectively.

EXAMPLE 8
Deep Oxidation of Ethanol

Figure 7:
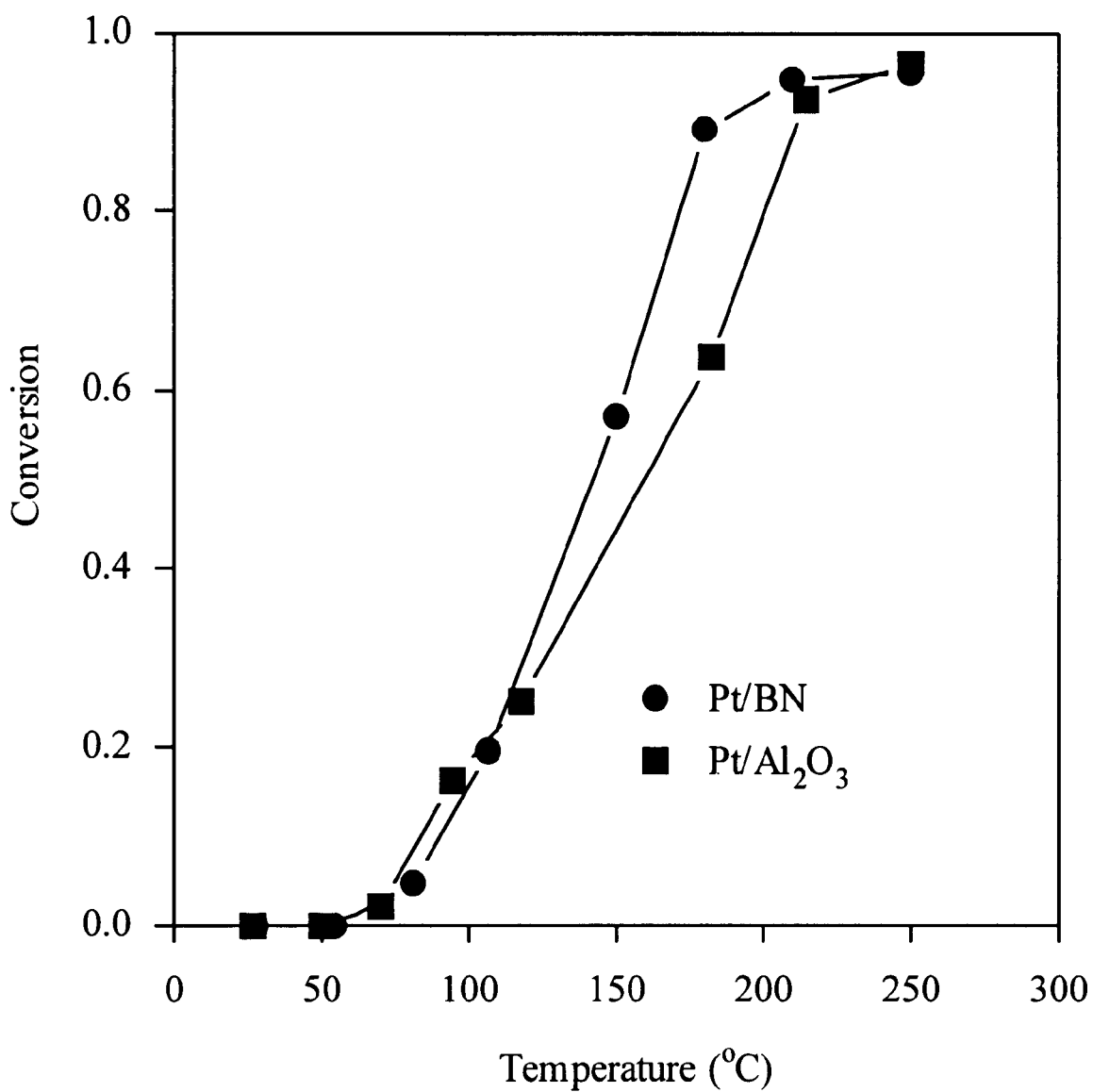
FIG. 7 shows the conversion of ethanol vapor which is oxidized in air by the Pt/BN catalyst and the $Pt/Al_2O_3$ catalyst, respectively.

The deep oxidation of ethanol was conducted on Pt/BN and Pt/Al$_2$O$_3$ catalysts under the same conditions as in Example 6. FIG. 7 shows the temperature dependencies of ethanol oxidation on Pt/BN and Pt/Al$_2$O$_3$, respectively. The light-off temperature of Pt/BN was near 140° C., and 90% conversion can be achieved at 200° C. The light-off temperature of Pt/Al$_2$O$_3$ was near 160° C., and higher than that of Pt/BN. Thus the activity of Pt/BN was again superior to that of Pt/Al$_2$O$_3$.

EXAMPLE 9
Deep Oxidation of Isopropanol

Figure 8:
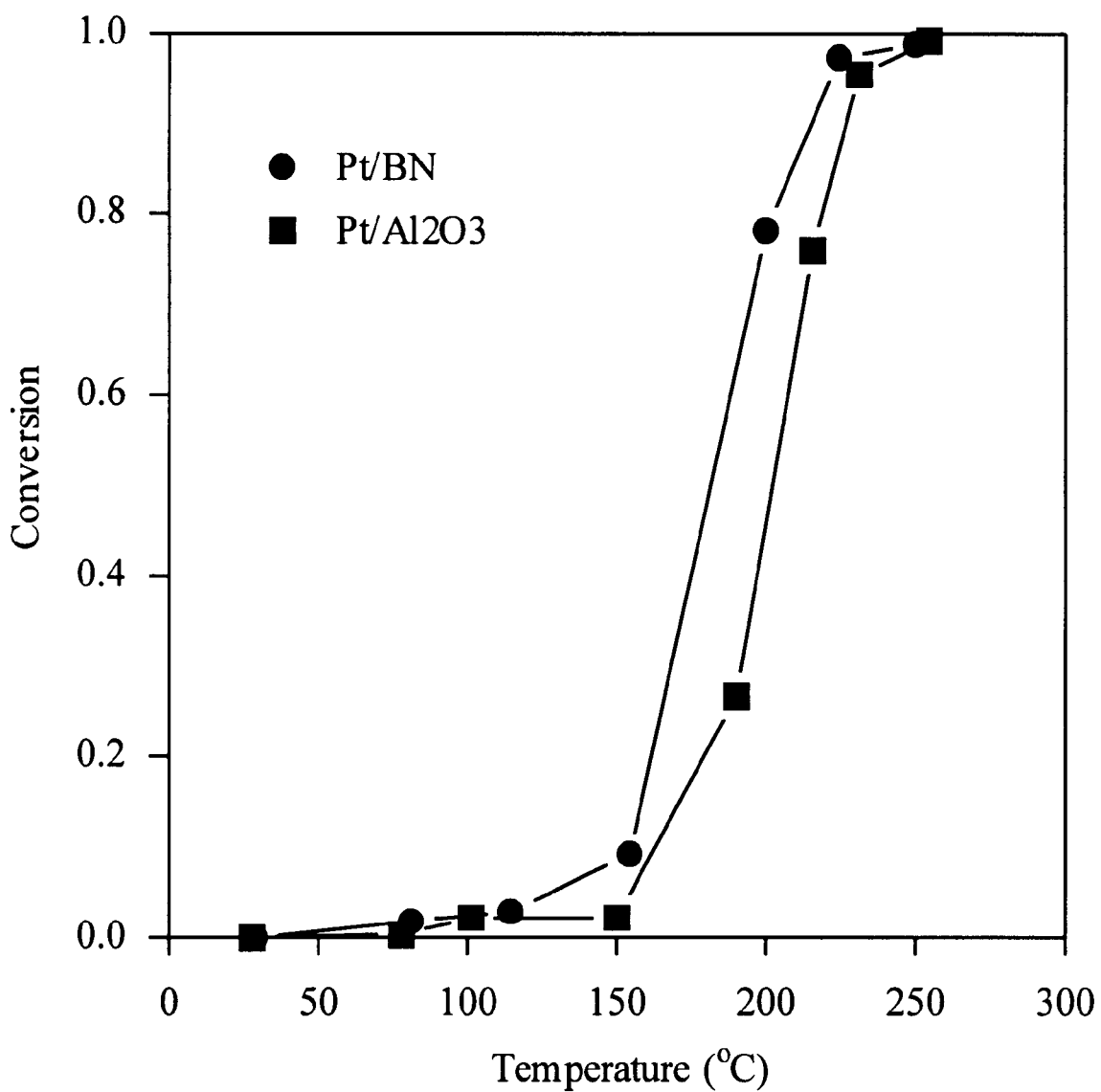
FIG. 8 shows the conversion of isopropanol vapor which is oxidized in air by the Pt/BN catalyst and the $Pt/Al_2O_3$ catalyst, respectively.

The deep oxidation of isopropanol was conducted on Pt/BN and Pt/Al$_2$O$_3$ catalysts under the same conditions as in Example 6. FIG. 8 shows the temperature dependencies of isopropanol oxidation on Pt/BN and Pt/Al$_2$O$_3$, respectively. The light-off temperature of Pt/BN was near 175° C., and 90% conversion could be achieved at 210° C. The light-off temperature of Pt/Al$_2$O$_3$ was near 200° C., and higher than that of Pt/BN. Thus the activity of Pt/BN was again superior than that of Pt/Al$_2$O$_3$.

EXAMPLE 10
Characteristics of Catalysts Before and After the Deep Oxidation

Table 1 lists the specific surface areas, and Table 2 lists the Pt loadings and dispersions of Pt/BN and Pt/Al$_2$O$_3$, respectively. They were measured before and after the deep oxidation of gasoline vapor at 500° C. The specific surface area of fresh Pt/BN and Pt/Al$_2$O$_3$ catalysts were 70, and 99 m$^2$/g, respectively. After the deep oxidation, the specific surface area of Pt/BN maintained at near 70 m$^2$/g, while that of Pt/Al$_2$O$_3$ decreased to 84 m$^2$/g due to the phase transformation of alumina support by the deep oxidation. Initially, the Pt loadings were near 0.3 wt % in both catalysts. There was no Pt loss either Pt/BN or Pt/Al$_2$O$_3$ after the deep oxidation. As shown in Table 2, for fresh catalysts, the dispersion of Pt/BN and Pt/Al$_2$O$_3$ were 19% and 30%, respectively. The variation of Pt dispersion could be due to the diverse specific surface areas among BN and Al$_2$O$_3$ (shown in Table 1). The Pt dispersions of Pt/BN and Pt/Al$_2$O$_3$ remained unchanged after the deep oxidation of gasoline vapor. The residual B—O bond of BN surface provided an excellent anchor for Pt cluster, thus preventing Pt loss during the deep oxidation.

TABLE 1

Specific surface areas of Pt catalysts

| Catalysts | Fresh (m$^2$/g) | Deep oxidation* (m$^2$/g) | Ave. particle size# (μm) |
|---|---|---|---|
| Pt/BN | 70 | 69 | 10 |
| Pt/Al$_2$O$_3$ | 99 | 84 | 180 |

*deep oxidation: 2500 ppmv gasoline vapor in air up to 500° C.
average particle size measured by laser scattering (Coulter LS230).

TABLE 2

Platinum loading and dispersion of catalysts

| Catalysts | Fresh (wt %) | Dispersion (%) | Deep oxidation* (wt %) | Dispersion (%) |
|---|---|---|---|---|
| Pt/BN | 0.30 | 19 | 0.29 | 19 |
| Pt/Al$_2$O$_3$ | 0.29 | 30 | 0.28 | 29 |

*Deep oxidation: 2500 ppmv gasoline vapor in air up to 500° C.

EXAMPLE 11
X-ray Diffraction Spectra of the Pt/BN Catalyst

Figure 9:
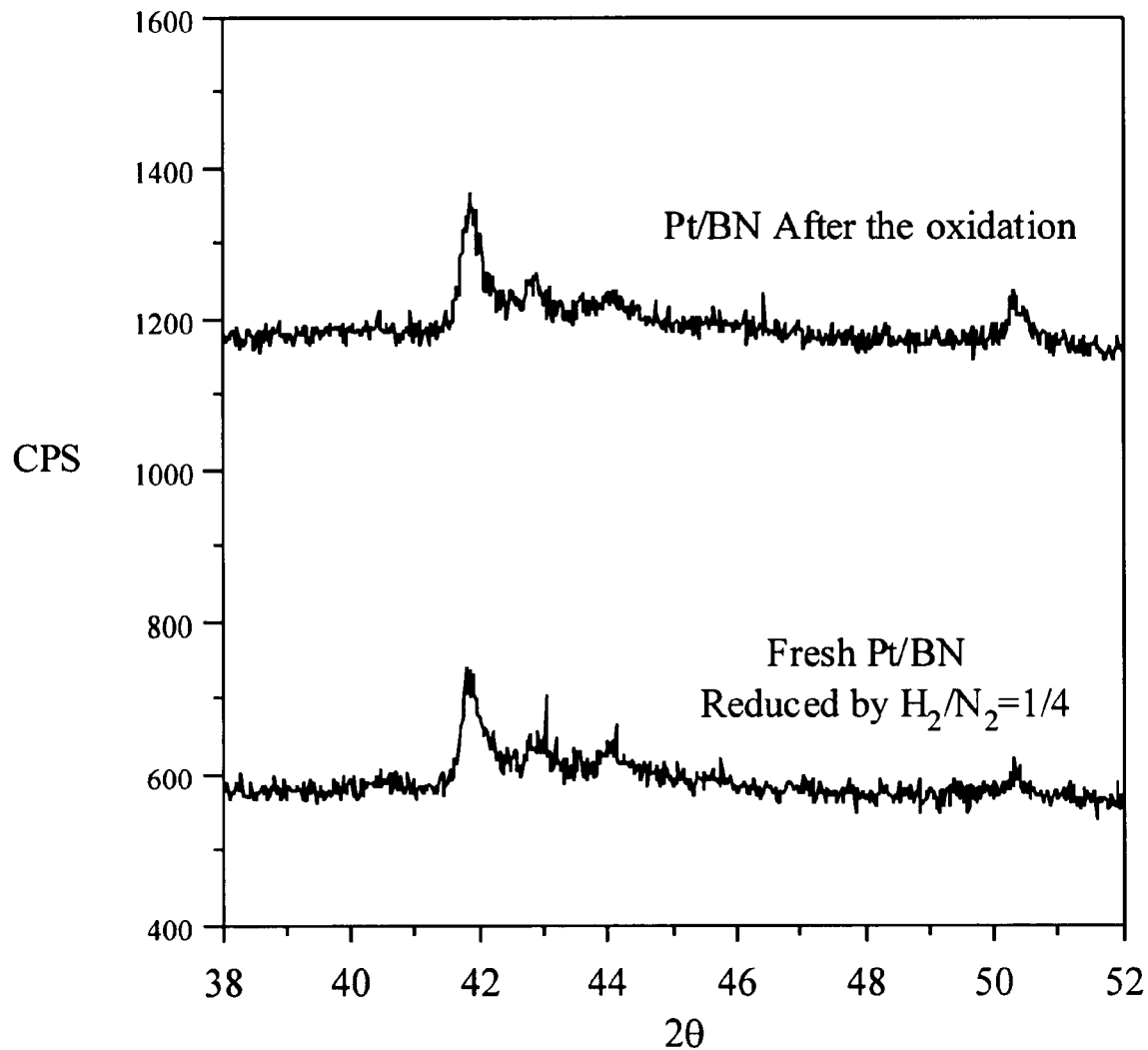
FIG. 9 is a X-ray diffraction (XRD) spectra of the Pt/BN catalyst before and after the deep oxidation, respectively.

FIG. 9 displays the X-ray diffraction (XRD) spectra of the Pt/BN catalyst before and after the deep oxidation of gasoline vapor at 500° C. In general, two characteristic diffraction peaks of Pt can be observed at 2θ=39.5° and 2θ=46° if the size of Pt cluster is larger than 20 nm. For fresh Pt/BN catalyst, no diffraction peak is detected at 2θ=39.5° or 2θ=46° indicating that the size of Pt cluster is, at least, less than 20 nm and spread smoothly on the surface of the BN. As shown in FIG. 9, after the deep oxidation, no diffraction peak is detected at 2θ=39.5° or 2θ=46° indicating that the Pt cluster is not sintered during the deep oxidation at 500° C.

Although BN is used as the support and platinum is used as the noble metal in the experiment, the noble metal selected from a group consisting of platinum (Pt), palladium (Pd), rhodium (Rh), Ruthenium (Ru) and a mixture thereof can be supported on the surface of the BN according to the present invention. As described above, because BN has the advantages of high thermal stability, high thermal conductivity, chemical inertness and hydrophobic character, the problems encountered in the alumina support are thus solved.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A process to form a catalyst for complete oxidation of organic compounds, the catalyst consisting of a boron nitride support and a noble metal, wherein said noble metal is dispersed on the surface of said boron nitride support, comprising steps of:
   (a) dissolving a noble metal complex compound in an organic solvent to form a solution;
   (b) mixing said solution with said boron nitride (BN) to form a wet boron nitride (BN) such that said noble metal complex compound is spread on said surface of said boron nitride (BN); and
   (c) thermally treating said noble metal complex at a temperature in the range of 300 to 500° C. by a gas stream.

2. The process according to claim 1, wherein the specific surface area of said boron nitride (BN) ranges from 10 to 100 m$^2$/g.

3. The process according to claim 1, wherein said noble metal is selected from the group consisting of platinum (Pt), palladium (Pd), rhodium (Rh), Ruthenium (Ru) and mixtures thereof.

4. The process according to claim 1, wherein the loading of said noble metal ranges from 0.1 to 5.0 wt %.

5. The process according to claim 1, wherein said organic solvent is an alcohol.

6. The process according to claim 5, wherein said alcohol is methanol.

7. The process according to claim 1, wherein said gas is selected from the group consisting of nitrogen gas, air, oxygen gas and hydrogen gas and mixtures thereof.

* * * * *